(12) United States Patent
Pozzi

(10) Patent No.: US 7,992,939 B2
(45) Date of Patent: Aug. 9, 2011

(54) HEAD REST MECHANISMS AND ASSEMBLIES

(75) Inventor: Alexander N. Pozzi, Highland Village, TX (US)

(73) Assignee: Weber Aircraft LLC, Gainesville, TX (US)

( * ) Notice: Subject to any disclaimer, the term of this patent is extended or adjusted under 35 U.S.C. 154(b) by 643 days.

(21) Appl. No.: 11/726,521

(22) Filed: Mar. 22, 2007

(65) Prior Publication Data

US 2007/0284928 A1   Dec. 13, 2007

Related U.S. Application Data

(60) Provisional application No. 60/785,229, filed on Mar. 23, 2006.

(51) Int. Cl.
*A47C 7/36* (2006.01)
(52) U.S. Cl. ...................................................... 297/410
(58) Field of Classification Search .................. 297/410, 297/353, 284.7, 411.36, 411.1
See application file for complete search history.

(56) References Cited

U.S. PATENT DOCUMENTS

| | | | | |
|---|---|---|---|---|
| 73,782 A | * | 1/1868 | Chiles | 297/410 |
| 1,375,868 A | * | 4/1921 | Thompson | 297/284.7 |
| 2,831,530 A | | 4/1958 | Chiopelas et al | |
| 3,027,194 A | * | 3/1962 | Rumptz | 297/410 |
| 3,511,535 A | * | 5/1970 | Gunlock | 297/410 |
| 3,947,140 A | * | 3/1976 | Thomas | 403/108 |
| 4,362,334 A | * | 12/1982 | Ross et al. | 297/230.12 |
| 4,565,409 A | * | 1/1986 | Hollonbeck et al. | 297/411.1 |
| 4,854,639 A | * | 8/1989 | Burleigh et al. | 297/250.1 |
| 5,054,853 A | * | 10/1991 | Gillies et al. | 297/250.1 |
| 6,250,716 B1 | | 6/2001 | Clough | |
| 6,375,119 B2 | | 4/2002 | Park et al. | |
| 6,378,950 B1 | * | 4/2002 | Takamizu et al. | 297/484 |
| 6,419,321 B1 | * | 7/2002 | Sack | 297/405 |
| 2004/0217639 A1 | | 11/2004 | Clough | |

FOREIGN PATENT DOCUMENTS

| | | |
|---|---|---|
| DE | 103 18 927 A1 | 11/2004 |
| DE | 10 2004 003 389 A1 | 8/2005 |
| FR | 2 836 100 | 8/2003 |
| FR | 2 837 437 | 9/2003 |
| GB | 1378430 | 12/1974 |
| JP | 2004 202062 | 7/2004 |

OTHER PUBLICATIONS

Partial International Search Report in related International Application No. PCT/US2007/007096.
Abstract of JP2004 202062 (Jul. 22, 2004).

* cited by examiner

*Primary Examiner* — David Dunn
*Assistant Examiner* — Tania Abraham
(74) *Attorney, Agent, or Firm* — Dean W. Russell; Kilpatrick Townsend & Stockton LLP

(57) ABSTRACT

Detailed are head rest mechanisms and assemblies containing a flexible collar. Portions of the collar may be moved independently from other portions and may pivot or otherwise move both forward of the seat back and vertically under passenger control. Also described are slide assemblies containing deformable projections for use with vertically-adjustable head rests.

5 Claims, 5 Drawing Sheets

HEAD REST MECHANISMS AND ASSEMBLIES

CROSS REFERENCE TO RELATED APPLICATION

This application claims the benefit of U.S. Provisional Patent Application No. 60/785,229 entitled "Head Rest Mechanisms and Assemblies" filed on Mar. 23, 2006, the contents of which are incorporated herein by reference.

FIELD OF THE INVENTION

This invention relates to head rests associated with seat backs and more particularly, although not necessarily exclusively, to adjustable rests forming parts of seats on-board passenger vehicles such as commercial aircraft.

BACKGROUND OF THE INVENTION

Head rests are used widely as parts of seats for commercial airplane passengers. Some such rests are adjustable vertically so as to accommodate different torso lengths of various passengers. Others include peripheral portions forwardly adjustable at angles to a central portion. Each mechanically-adjustable portion, sometimes denoted an "ear" or a "wing," may support both a side and the back of a passenger's head when forwardly adjusted.

U.S. Pat. No. 6,375,119 to Park, et al., discloses another type of adjustable head rest for use with passenger aircraft seats. Included as part of the head rest cushion of the Park patent is an internal inflatable bladder. Electrically-operated pumps and vents inflate and deflate the bladder under direction of a passenger.

Although head rest adjustability is valuable to aircraft passengers, particularly on long-haul flights, existing head rests do not meet all current passenger needs and desires. No commercially-available head rest is universally adjustable, for example, in three-dimensional space. Additionally, many existing head rests require too-frequent maintenance as a result of passenger use.

SUMMARY OF THE INVENTION

The present invention provides head rest mechanisms and assemblies designed to address deficiencies in existing devices. One aspect of the invention involves utilizing a flexible collar as part of a head rest assembly. The collar may pivot, or otherwise move, forward of the seat back as well as vertically under passenger control. Portions of the collar, further, may be pivoted independently. By attaching the collar to an existing vertically-adjustable head rest, the combined mechanism may provide useful support for event the tallest human passengers.

A preferred version of the collar comprises an elongated, flexible rod whose central portion is connected to a plate of a seat head rest. Opposite ends of the rod are independently moveable relative to the fixed central portion yet sufficiently rigid to retain their positions, once adjusted, until readjusted by a passenger (or flight attendant). The rod may be covered with foam, leather, or other materials to provide a cushioning effect when contacted by the passenger's head.

Also included as part of the present invention are innovative slide assemblies for vertically-adjustable head rests. Deformable projections present in the slides provide adequate interference with associated guides to maintain the slides in positions desired by passengers. Including the projections on the slides themselves, however, avoids need for any separate element to supply the needed interference fit with the guides. By omitting a separate friction-providing element, a slide assembly of the present invention reduces maintenance requirements significantly.

It thus is an optional, non-exclusive object of the present invention to provide alternate head rest mechanisms and assemblies.

It is also an optional, non-exclusive object of the present invention to provide adjustable head rests for use with seating equipment.

It is another optional, non-exclusive object of the present invention to provide a flexible collar as part of a head rest.

It is an additional optional, non-exclusive object of the present invention to provide a head rest having a component that may move both forward and backward and up and down relative to a fixed location.

It is, moreover, an optional, non-exclusive object of the present invention to provide slides with deformable projections to provide frictional interference with associated guides.

Other objects, features, and advantages of the present invention will be apparent to those skilled in the relevant art with reference to the remaining text and drawings of this application.

DETAILED DESCRIPTION

Figure 1:
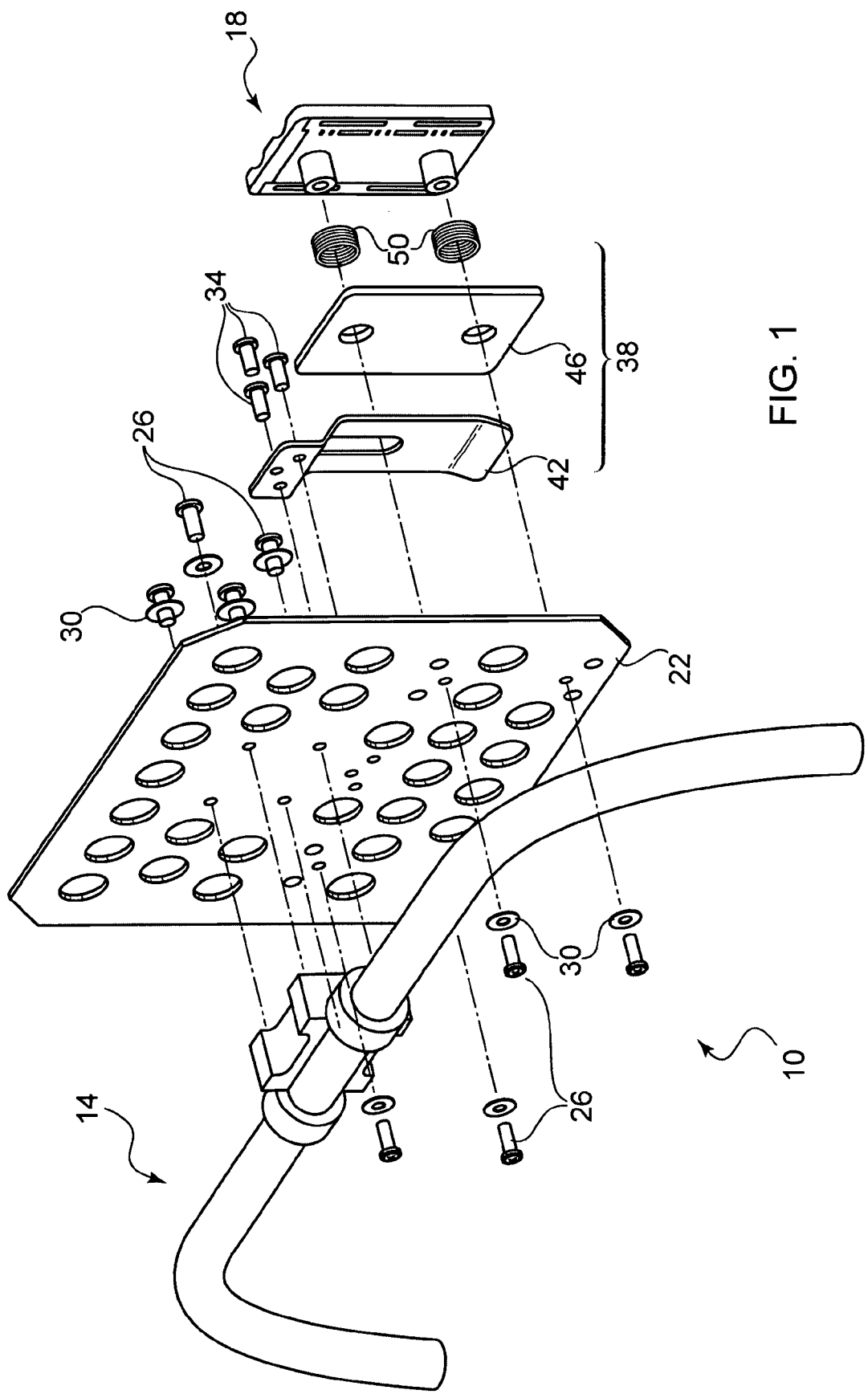
FIG. 1 is an exploded perspective view of portions of a head rest assembly of the present invention.

Illustrated in FIG. 1 are aspects of head rest assembly 10 of the present invention. Included as part of assembly 10 may be either or both of collar 14 and slide 18. If present, each of collar 14 and slide 18 may be immovably connected to plate 22, which in some respects forms a base for assembly 10. Although various screws 26, washers 30, and rivets 34 are depicted in FIG. 1, other fasteners or connecting means may be employed instead.

Preferably positioned intermediate slide 18 and plate 22 are spacing and resiliency members 38. These members 38 may include any or all of stop 42, spacer 46, and springs 50. The members 38 collectively provide structure permitting movement of assembly 10 when its vertical adjustment is desired.

Figure 2:
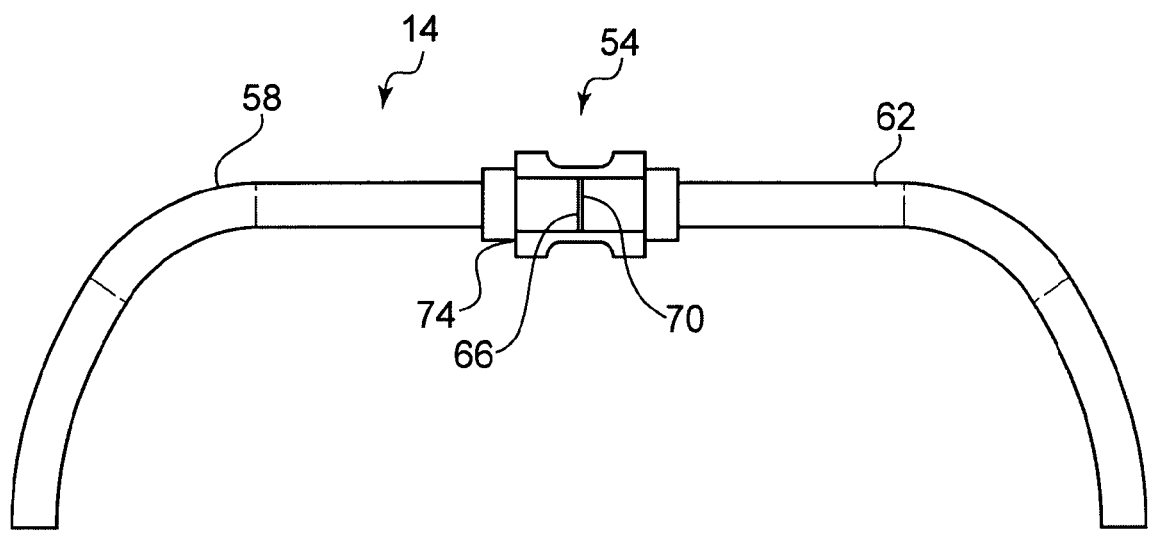
FIG. 2 is a front elevational view of a collar of the invention shown in FIG. 1.

FIG. 2 details collar 14 of the invention having a central portion 54. As shown in the drawing, collar 14 beneficially includes members 58 and 62 whose respective ends 66 and 70 are connected (directly or indirectly) to weldment 74. Such ends 66 and 70, together with weldment 74, thus form central portion 54. Alternatively, members 58 and 62 may be combined into a single member.

In a preferred version of collar 14, each of members 58 and 62 is an elongated rod protruding from weldment 74. Each rod is sufficiently flexible to be moveable under manual force yet sufficiently inflexible to remain in position when such force is withdrawn. FIGS. 1-2 illustrate collar 14 in an undeployed condition, with member 58 and 62 each curving downward from weldment 74. In this condition, collar 14 remains essentially in the plane of its associated seat back, thereby not providing any additional support for a passenger's head.

Figure 3:
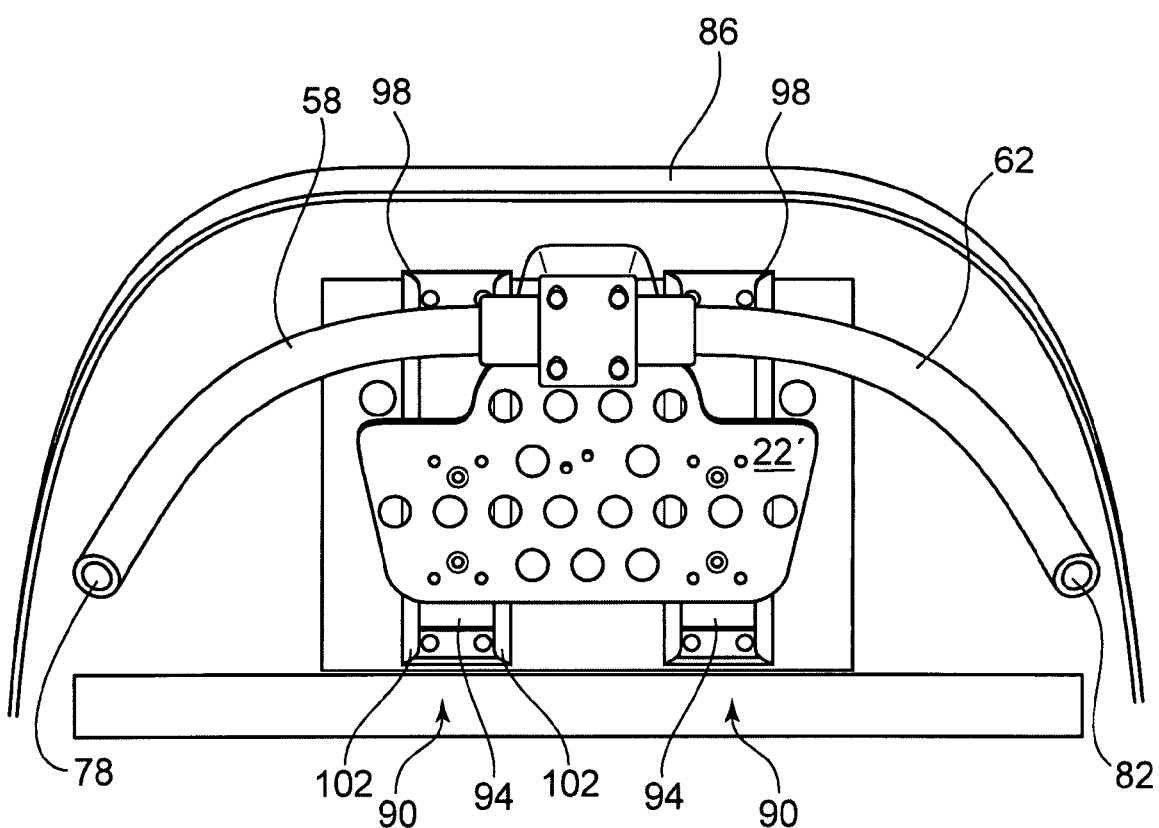
FIG. 3 is a view illustrating the collar of FIG. 1 as positioned in vertical-adjustment guides.

By contrast, FIGS. 3-6 depict various exemplary deployments of collar 14. In FIG. 3, for example, members 58 and 62 no longer curve downward from weldment 74, instead being rotated ninety degrees so as to curve outward therefrom. Respective ends 78 and 82 of members 58 and 62 thus no longer are essentially in the plane of seat back 86, but rather are perpendicular thereto. As so positioned, member 58 could help support the right side of a passenger's face should he or she lean rightward in the seat. Member 62, in turn, could help support the left side of the passenger's face should leftward leaning occur.

Figure 4:
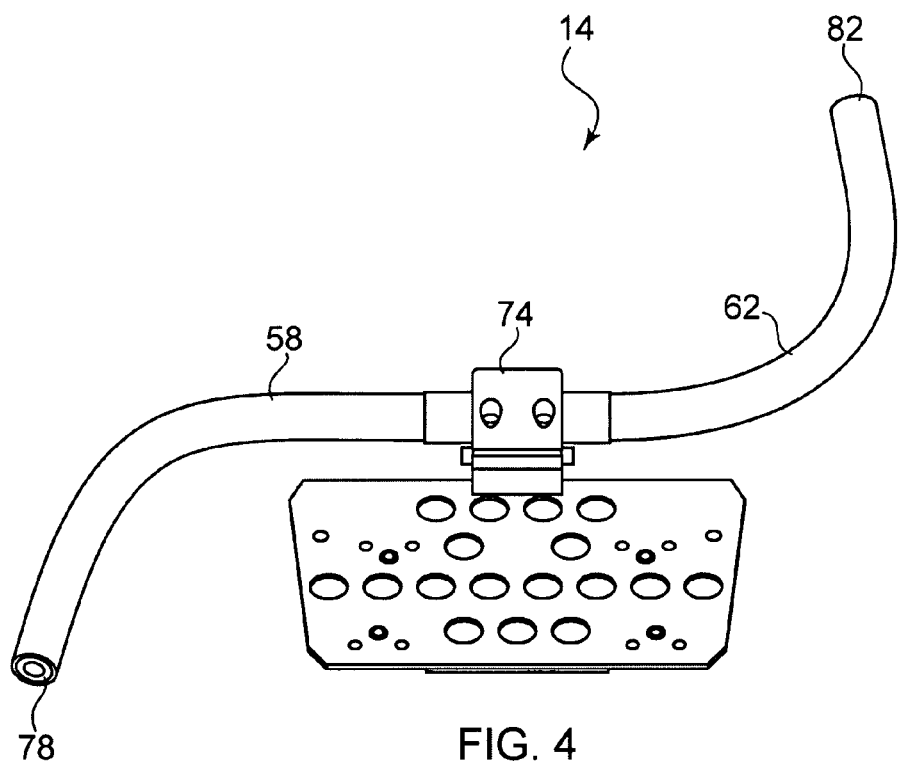
FIGS. 4-6 illustrate exemplary manners in which the collar of FIG. 1 may be adjusted by a passenger.

FIG. 4 depicts positioning of collar 14 so that member 58 remains undeployed while member 62 has been rotated one hundred eighty degrees. In this configuration member 62 curves upward while remaining generally in the plane of the seat back. Should a passenger be extremely tall, having member 82 curve upward could permit it to help support the passenger's head notwithstanding the passenger's unusual height.

Figure 5:
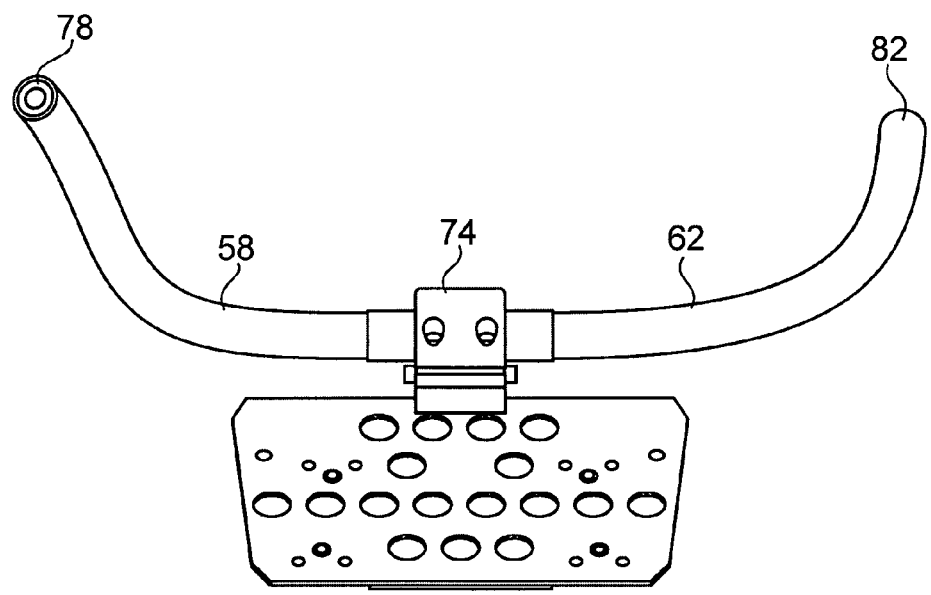
Figure 6:
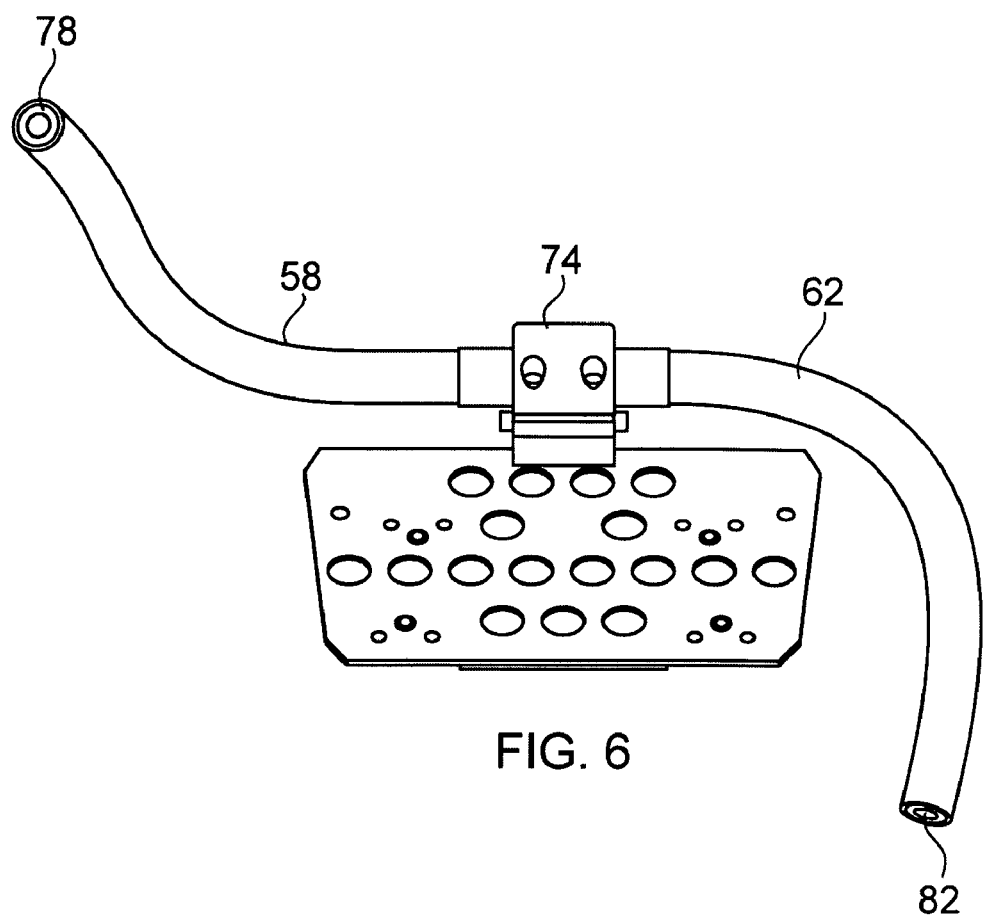

FIG. 5 illustrates member 62 in the same position as it appears in FIG. 4 and member 58 in the same position as it appears in FIG. 3. FIG. 6 likewise depicts member 58 in its position of FIGS. 3 and 5. Member 62, by contrast, is shown in its undeployed position of FIGS. 1-2. The manipulation of collar 14 illustrated in FIG. 6 may occur, for example, when a passenger desires merely to lean to his or her right and rest his or her face on a firmly-positioned object.

Detailed also in FIG. 3 is base plate 22' to which collar 14 is connected as well as guides 90 rigidly connected to seat back 86. Base plate 22' is functionally equivalent to base plate 22 (albeit slightly different in appearance). Each of guides 90 is an elongated structure comprising base 94. At each end of base 94 is an outwardly-extending flange 98 together with a laterally-extending flange 102. Collectively, each base 94 and corresponding flanges 98 and 102 form a pair of opposed vertically-oriented slots into which a slide 18 may be fitted for travel. As slide 18 travels within the slots, head rest assembly 10 is adjusted vertically with respect to seat back 86.

Figure 7:
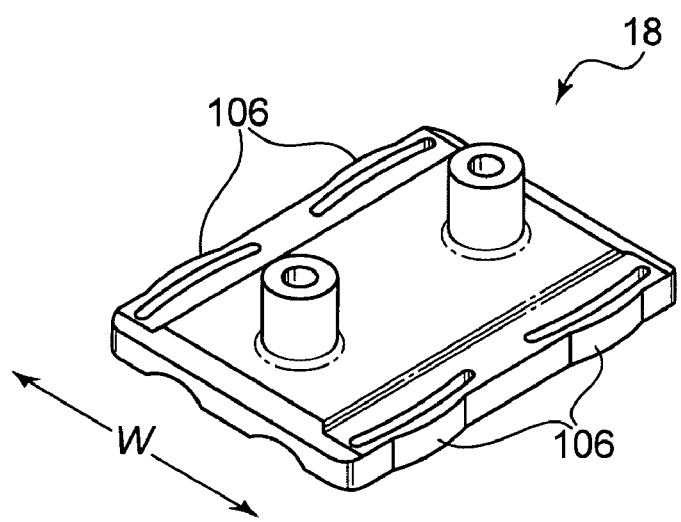
FIG. 7 is a perspective view of a slide of FIG. 1 detailing its peripheral deformations.

FIG. 7, finally, shows slide 18 of the present invention. Slide 18 has a width W approximately equal to the distance between opposed slots of a guide 90. Curved peripheral projections 106 cause the width W of slide 18 to be slightly greater than the distance between the opposed slots. However, because projections 106 are deformable under pressure, slide 18 may readily be fitted into guide 90. Projections 106 then bear slightly against outwardly-extending flanges 98 of the guide 90, providing adequate friction to maintain slide 18 in a selected position relative to guide 90. Should, however, a passenger desire to adjust assembly 10 vertically, he or she need merely apply upward or downward force on the assembly 10; application of such manual force overcomes the frictional interference between projections 106 and flanges 98, causing slide 18 to travel within guide 90. If necessary, stop 42 may be configured to limit the extent to which slide 18 may move upward or downward within guide 90.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A seat assembly comprising:
   a. a seat back; and
   b. a head rest assembly connected to the seat back and comprising:
      i. a guide defining spaced opposed slots; and
      ii. a slide comprising a plurality of curved peripheral projections (A) received by the slots in use and (B) deformable under pressure so as to allow the slide to travel within the guide.

2. A seat assembly according to claim 1 further comprising a collar moveable with the slide.

3. A seat assembly according to claim 2 in which the collar comprises a central portion and a first member extending therefrom, the first member configured so as to be adjustable both vertically and horizontally relative to the central portion.

4. A seat assembly according to claim 1 in which the slots are vertically oriented.

5. A seat assembly according to claim 1 in which the slide comprises opposed sides defining a width approximately equal to the spacing of the slots, each side including at least two of the plurality of curved peripheral projections.

* * * * *